United States Patent [19]

Leonard et al.

[11] Patent Number: 4,729,832
[45] Date of Patent: Mar. 8, 1988

[54] METHOD FOR REMOVAL OF COAL TAR BASED CONTAMINANTS FROM WASTE WATERS

[75] Inventors: Robert E. Leonard; Darrell W. Clinton, both of Oklahoma City, Okla.

[73] Assignee: Kerr-McGee Chemical Corporation, Oklahoma City, Okla.

[21] Appl. No.: 854,423

[22] Filed: Apr. 21, 1986

[51] Int. Cl.$^4$ ............................................. C02F 1/26
[52] U.S. Cl. ................................... 210/639; 210/634; 210/909
[58] Field of Search ...................... 210/634, 639, 909

[56] References Cited

U.S. PATENT DOCUMENTS 2,808,375  10/1957  Manka ............................... 210/639

FOREIGN PATENT DOCUMENTS 714904  9/1954  United Kingdom ................. 210/909

OTHER PUBLICATIONS

*Encyclopedia of Chemical Technology*, Kirk–Othmer, vol. 19, 2nd ed., 1969, pp. 554–564, 668, 671–675.
Weesner, C. W., et al., *Reducing Phenol Wastes from Coke Plants*, Steel Industry Action Committee of the Ohio River Valley Water Sanitation Commission, 1953, pp. 1–26.
D. G. Murdoch and M. Cuckney "The Removal of Phenols from Gas Works Ammoniacal Liquor", Oct. 8, 1946.
B. K. Wallin, A. J. Condren and R. L. Walden, "Removal of Phenolic Compounds from Wood Preserving Waste Waters", Apr. 1981.
G. A. Lorton, "Removal of Phenols from Process Condensate", Oct. 1977.

Primary Examiner—Richard V. Fisher
Assistant Examiner—Jeffrey W. Peterson
Attorney, Agent, or Firm—William G. Addison; John P. Ward

[57] ABSTRACT

The invention relates to a method for substantially reducing the concentration of coal tar based contaminants in waste water streams. The method comprises first forming an intimate mixture of the waste water stream to be treated with at least one coal tar based extractant. The intimate mixture then is subjected to an extraction temperature sufficient to reduce the concentration of the contaminant in the waste water stream to its equilibrium concentration as the extraction temperature employed. Finally, the mixture is separated and a treated waste water stream recovered which is characterized by a substantially reduced and constant concentration of the contaminants and a substantially reduced biological demand.

5 Claims, 1 Drawing Figure

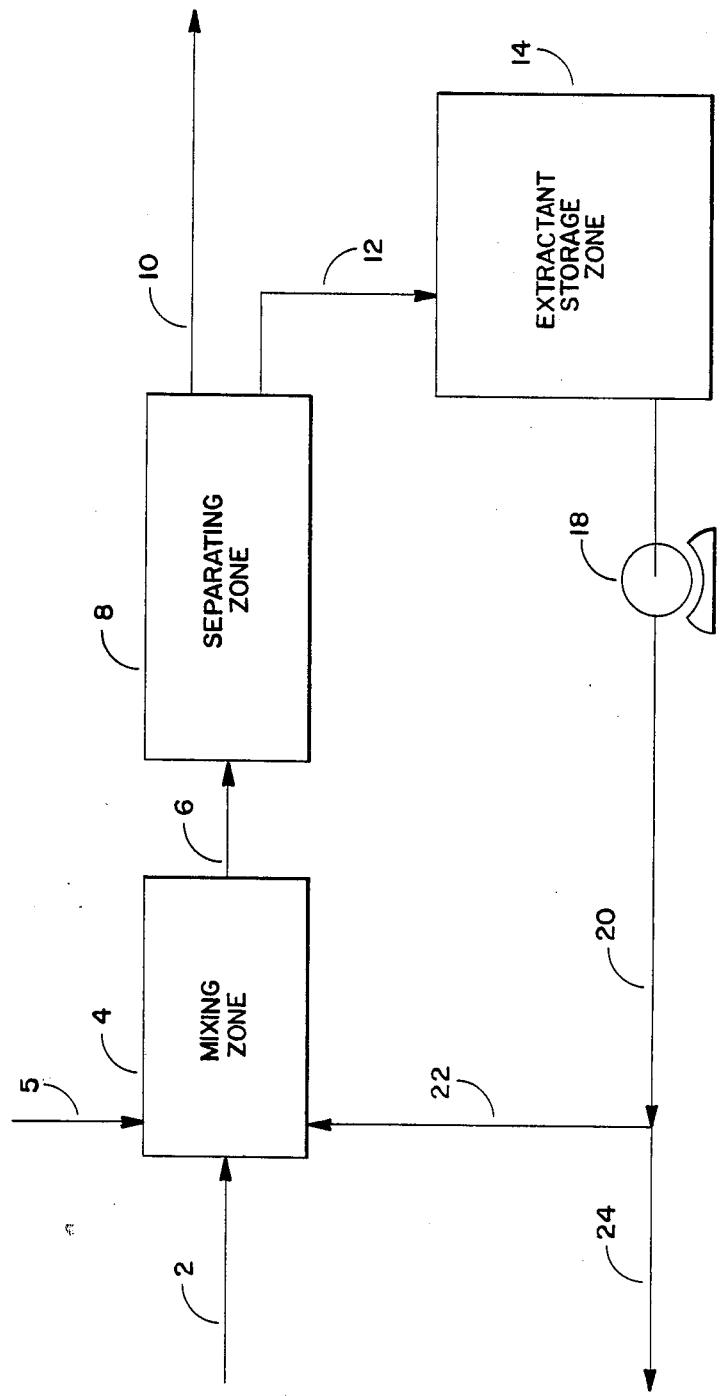

METHOD FOR REMOVAL OF COAL TAR BASED CONTAMINANTS FROM WASTE WATERS

FIELD OF THE INVENTION

The present invention relates to a method for substantially reducing the concentration of coal tar based contaminants found in waste water streams. More particularly, the invention relates to a method for treating waste water streams recovered from wood drying processes employing coal tar based wood preservations as heat transfer media to provide a waste water stream having a substantially reduced and constant contaminant concentration.

BACKGROUND OF THE INVENTION

The use of artificial drying processes to remove water from green wood products prior to their being impregnated with a wood preservative agent is a common practice in today's wood preserving industry. One widely employed batch drying process is the Boulton process. In this process, the green wood products to be dried are placed in a suitable treatment vessel, submerged in a coal tar based heat transfer medium and heated to an elevated temperature while gradually applying a vacuum to the vessel. The treatment of the wood products, under these conditions, is continued until such time as a predetermined amount of water inherent in the wood products, i.e., sap water, is removed therefrom.

The sap water removed from the wood products forms a waste water stream. This stream contains various coal tar based contaminants including such materials as phenol, naphthalene, and the like. These materials are present in the heat transfer medium employed in the drying process and are stripped therefrom during the operation of the process.

Generally, the concentration of these contaminants in the waste water stream exceeds the permissible limits established by federal, state, and local authorities for waters discharged into the environment. Therefore, it is necessary to first treat the waste water stream to reduce the concentration of these contaminants to at least the permissible limits before their discharge.

While many different waste water treatment systems are available for accomplishing this reduction, a most effective and relatively inexpensive system is one based on biological oxidation. However, waste treatment systems based on biological oxidation are very sensitive to "shock loading." This phenomenon occurs from sudden and drastic changes in the compositional make-up of the waste water streams being fed to the treatment system. Thus, in the biological treatment of waste water streams which can undergo sudden and drastic changes in composition large volume equipment must be employed. The use of such large volume equipment is expensive both in terms of tankage costs as well as land utilization.

SUMMARY OF THE INVENTION

It now has been discovered that waste water streams containing coal tar based contaminants can be processed in accordance with the present invention to provide a treated waste water stream containing a substantially reduced and constant concentration of these contaminants.

According to the present invention, a method is provided wherein an intimate mixture first is formed comprising the waste water stream, at least one coal tar based extractant selected from the group consisting of creosote coal tar solutions and creosote petroleum oil solutions, and optionally, at least one demulsifying agent. The intimate mixture, once formed, is subjected to an extraction temperature for an extraction period of time sufficient to effect a transfer of an amount of the coal tar based contaminants in the waste water stream to the extractant. At the end of the extraction period the waste water stream and extractant are separated and recovered individually.

BRIEF DESCRIPTION OF THE DRAWING

The single FIGURE is a schematic view illustrating the general flow of materials and operational steps of the method of this invention.

DETAILED DESCRIPTION OF THE INVENTION

As disclosed hereinabove, the present invention relates to a method for substantially reducing the concentration of coal tar based contaminants found in waste water streams.

Referring to the single FIGURE which provides a schematic illustration of the general flow of materials and operational steps of the method of this invention, a waste water stream is introduced via conduit 2 into mixing zone 4. This waste water stream will comprise those waste water streams recovered from those processes employed for artificially drying various green wood products and in which there is utilized a coal tar based preservative agent as a heat transfer medium. The waste water stream itself will contain coal tar based contaminants such as phenols, naphthalenes, and the like. These contaminants are present in the waste water stream as a result of having been stripped from the wood preservative heat transfer medium during operation of the above discussed drying processes.

Contemporaneously with or subsequent to the introduction of the waste water stream into mixing zone 4, an extractant is introduced into mixing zone 4 from extractant storage zone 14 by way of pump 18 and communicating conduits 20 and 22. The materials useful as extractants in the practice of this invention will include those materials which have a greater affinity for the coal tar based contaminants than the waste water stream in which the contaminants are contained. In addition, the materials useful as extractants in the practice of this invention are those which are economically expedient in that they comprise materials usually found on hand in a wood preserving facility. Thus, extractants which can be introduced into mixing zone 4 will be those coal tar based materials selected from the group consisting of creosote coal tar solutions and creosote petroleum oil solutions. A detailed description of each of these coal tar based solutions is provided in ASTM designation D391-78 and the American Wood Preserver's Association (AWPA) Standard P4, respectively. Each of these descriptions is incorporated herein by reference in its entirety.

The quantity of coal tar based extractant introduced into mixing zone 4 and mixed with the waste water streams will be controlled such as to provide a ratio, by volume, of the extractant to the waste water stream ranging from about 0.1:1 to about 10:1. Higher ratios can be employed but a most effective and economical range of ratios was found to be one volume of the coal tar based extractant to from 1 to 4 volumes of the waste water stream undergoing treatment.

The difference in the specific gravities between the waste water streams being treated and the coal tar based extractant is small. As a result, it was found that the subsequent separation of the mixture of the waste water stream and the coal tar based extractant in separation zone 8 can be slow. Thus, in an alternative embodiment of the present invention, a suitable demulsifying agent also is introduced into mixing zone 4 to enhance this rate of separation. This demulsifying agent can be introduced separately into mixing zone 4 through conduit 5 or first mixed with the waste water stream in conduit 2 or the coal tar based extractant in conduit 22 for introduction into mixing zone 4.

The demulsifying agent introduced into mixing zone 4 can be any of the well-known surface active materials employed to enhance the phase separation of water and oil emulsions. These demulsifying agents include both inorganic and organic electrolytes. Particularly useful demulsifying agents are the cationic organic polyelectrolytes. These include the various known polyamines such as the poly(alkylene polyamines), poly(hydroxyalkaline polyamines), and polyamine quaternaries. A more complete description and listing of specific polyamines is found in *Kirk-Othmer Encyclopedia of Chemical Technology*, Vol. 19, pp 554–564, 2d(1969). Additional demulsifying agents which can be employed in the method of the present invention are amino resins such as the various polyamides as represented by polyacrylamide, poly(melamine formaldehyde) and poly(urea formaldehyde) resins.

The amount of demulsifying agent which can be introduced into mixing zone 4 can vary broadly. In general, however, the amount will be at least an amount sufficient to enhance the separation between the waste water stream and the coal tar based extractant once the mixture of these materials is introduced into separation zone 8. While the most effective amount will generally depend upon the relative quantities of the waste water stream and coal tar based extractant in the mixture of these materials, this amount can readily be determined by one of skill in this art using known testing procedures, e.g., settling tests.

Within mixing zone 4, which can be any conventional stirred vessel, static mixer or other known mixing-type apparatus, the intimate mixture of said waste water stream, coal tar based extractant and demulsifying agent is subjected to an extraction temperature for an extraction period of time. In general, the extraction temperature to which the intimate mixture is subjected can range from about 10° C. to about 95° C. However, it has been found that in order to affect the greatest reduction in the concentration of the coal tar contaminants in the waste water stream or transfer of said contaminants from said stream and into the coal tar based extractant, temperatures ranging from about 10° C. to about 30° C. preferably should be employed.

Generally, the extraction period of time that the intimate mixture is retained in mixing zone 4 will be the time required to reduce the concentration of the coal tar based contaminants in the waste water stream to their equilibrium concentration at the extraction temperature employed. For purposes of the present invention, the extraction period of time can range from about 1 minute to about 30 minutes or more within the range of extraction temperatures disclosed above.

Once the concentration of the coal tar based contaminants in the waste water stream has been reduced to the equilibrium concentration for these contaminants at the extraction temperature employed, the intimate mixture in mixing zone 4 is conveyed via conduit 6 to separation zone 8. Within separation zone 8, which may comprise one or more vessels such as conventional gravity settling and thickening tanks or powered separators such as centrifugal separators, the intimate mixture is separated into a treated waste water stream phase and a coal tar based extractant phase.

The treated waste water stream phase, containing a reduced concentration of the coal tar contaminants equivalent to about the equilibrium concentration for said contaminants at the extraction temperature employed, is withdrawn from separation zone 8 by way of conduit 10. This treated waste water stream, then can be conveyed by means not shown to a secondary waste treatment plant (not shown) for removal of the remaining reduced concentration of the coal tar based contaminants.

The coal tar based extractant phase is withdrawn from separation zone 8 by way of conduit 12. It is conveyed by way of conduit 12 to extractant storage zone 14 which can comprise one or more storage tanks or vessels. From storage zone 14 the contaminant containing extractant can be conveyed through pump 18 and communicating conduits 20 and 24 to a wood preserving process (not shown) wherein it can be employed to impregnate various wood products.

The following examples are illustrative of the operation of the method of the present invention. They are presented for purposes of illustration only and are not to be construed in any manner as limiting the scope and spirit of this invention.

EXAMPLES 1–3

A series of experiments was conducted to demonstrate the ability of a coal tar based material to extract phenol from a wood preserving plant waste water stream and further to reduce the chemical oxygen demand (COD) of the waste water stream. This series also was used to determine the equilibrium concentration of the phenol in the waste water stream treated in accordance with the present invention at various treatment temperatures.

Each experiment was performed by first adding a sample of the waste water stream, which contained 3,500 parts per million (ppm) of phenol and had a COD of 11,700 ppm, to a stirred vessel. To the vessel then was added and equal volume of the coal tar based extractant which, in this series, was a 60/40 by volume mixed solution of creosote and coal tar. The resulting waste water/extractant mixture then was maintained, with continuous stirring, at a preselected temperature. Samples were collected periodically and, after separation of the treated waste water stream from the extractant, the stream was analyzed for phenol content. The phenol content of these samples was determined using the 4-aminoantipyrine procedure described in "Standard Methods for the Examination of Water and Waste Water", American Public Health Association, Washington, D.C. Data relating to this series of experiments are set forth in the Table below.

TABLE

| Example No. | Treatment Temp., °C. | Phenol Eq. Conc.[a], ppm | COD, ppm |
| --- | --- | --- | --- |
| 1 | 10 | 250–300[b] | 4,000 |
| 2 | 24 | 350–500 | — |
| 3 | 95 | 650–750 | — |

[a]Eq. Conc. = equilibrium concentration
[b]Ranges are given based upon analysis of multiple samples As can be seen from the above data, the 60/40 by volume mixed solution of creosote and coal tar significantly reduced the concentrations of phenol from that present originally in the waste water stream. It also can be seen that the use of the present invention significantly reduces the COD of the stream as well.

EXAMPLE 4

To a vessel containing 80 milliliters (ml) of a waste water stream recovered from a wood preservation treatment plant and having a phenol concentration of 2,600 ppm were added 20 ml of a 70/30 by volume mixed solution of creosote and coal tar as an extractant. This mixture then was heated to and maintained at a temperature of 27° C. with constant agitation for a period of 5 minutes. The mixture then was allowed to settle and within 5 minutes 65 ml of the treated waste water had separated from the mixture. Analysis of a portion of this treated waste water revealed that it contained 295 ppm of phenol, representing an 88.6% by weight removal of the phenol. A total of 3 hours was required for complete separation of the treated waste water stream and mixed extractant.

EXAMPLE 5

An experiment similar to that of Example 4 was carried out with the exception that 200 ppm of a quaternary amine demulsifying agent available from the Witco Chemical Company under the designation RTC 330 were added to the mixture of the waste water stream and extractant. Following cessation of agitation, the treated waste water stream separated completely from the mixture within a period of 5 minutes. Analysis of a portion of this treated waste water stream revealed said stream to contain 305 ppm of phenol representing an 88.3% by weight reduction in the original phenol concentration of the waste water stream.

EXAMPLE 6

To demonstrate the ability of the present invention to extract naphthalene as well as phenol contaminant from a waste water stream recovered from a wood preserving plant the following experiment was conducted:

To a mixing vessel equipped with a turbine mixer continuously were added the waste water stream containing suspended naphthalene, a stream of a 70/30 by volume mixed solution of creosote and coal tar and a stream of a quaternary amine demulsifying agent. The rate of addition of these streams to the mixing vessel was adjusted to provide therein a mixture of 1 volume of the mixed solution of creosote and coal tar, 4 volumes of the waste water stream and 500 ppm of the demulsifying agent. The blended mixture continuously was overflowed into settling vessel wherein the mixture underwent phase separation into a naphthalene depleted waste water phase. Over a period of 24 hours, 393 pounds of naphthalene were extracted from the waste water stream undergoing treatment.

While the present invention has been described in terms of its known embodiments, it is understood that changes and modifications can be made without departing from the spirit and scope thereof.

What is claimed is:

1. A method for substantially reducing concentrations of phenol and naphthalene contaminants in a waste water stream recovered from a wood product drying process employing a coal tar based wood preservative as a heat transfer medium and for providing a treated waste water stream containing an equilibrium concentration of the phenol and naphthalene contaminants and a substantially reduced biological oxygen demand, said method consisting essentially of:

forming an intimate mixture comprising the waste water stream, at least one cationic organic polyelectrolyte demulsifying agent selected from the group consisting of polyamines and polyamides and at least one coal tar based extractant selected from the group consisting of creosote-coal tar solutions and creosotepetroleum oil solutions;

subjecting the intimate mixture to an extraction temperature ranging from about 10° C. to about 95° C. for an extraction period of time sufficient to effect a transfer of the contaminants from the stream and into the extractant and thereby reduce the concentration of the contaminants in the stream to the equilibrium concentration for the contaminants at the extraction temperature employed;

separating and recovering from the intimate mixture, a treated waste water stream characterized by a substantially reduced and constant concentration of the contaminants and a substantially reduced biological oxygen demand and a contaminant containing coal tar based extractant phase; and conveying the contaminant containing coal tar based extractant phase to a wood preserving process wherein the extractant is employed to impregnate wood products.

2. The method of claim 1 wherein the extractant and the waste water stream are present in the mixture in a ratio, by volume, of said extractant to said waste water stream ranging about 0.1:1 to about 10:1.

3. The method of claim 1 wherein said temperature ranges from about 10° C. to about 30° C.

4. A method for substantially reducing concentrations of phenol and naphthalene contaminants in a waste water stream recovered from a wood product drying process employing a coal tar based wood preservative as a heat transfer medium and for providing a treated waste water stream containing an equilibrium concentration of the phenol and naphthalene contaminants and a substantially reduced biological oxygen demand, said method consisting essentially of:

forming an intimate mixture comprising the waste water stream, at least one cationic organic polyelectrolyte demulsifying agent selected from the group consisting of polyamines and polyamides and at least one coal tar based extractant selected from the group consisting of creosote-coal tar solutions and creosote-petroleum oil solutions wherein the extractant and the waste water stream are present in the mixture in a ratio, by volume, of said extractant to said stream ranging from about 0.1:1 to about 10:1;

subjecting the intimate mixture to an extraction temperature ranging from about 10° C. to about 30° C. for an extraction period of time sufficient to effect a transfer of the contaminants from the stream and into the extractant and thereby reduce the concentration of the contaminants in the stream to the equilibrium concentration for the contaminants at the extraction temperature employed;

separating and recovering from the intimate mixture, a treated waste water stream characterized by a substantially reduced and constant concentration of the contaminants and a substantially reduced biological oxygen demand and a contaminant containing coal tar based extractant phase; and conveying the contaminant containing coal tar based extractant phase to a wood preserving process wherein the extractant is employed to impregnate wood products.

5. The method of claim 4 wherein said extractant and said stream are present in said mixture in a ratio by volume ranging from about 0.25:1 to about 1:1.